(12) United States Patent
Welton et al.

(10) Patent No.: US 7,547,665 B2
(45) Date of Patent: Jun. 16, 2009

(54) ACIDIC TREATMENT FLUIDS COMPRISING SCLEROGLUCAN AND/OR DIUTAN AND ASSOCIATED METHODS

(75) Inventors: Thomas D. Welton, Duncan, OK (US); Richard W. Pauls, Duncan, OK (US); Ian D. Robb, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 576 days.

(21) Appl. No.: 11/117,959

(22) Filed: Apr. 29, 2005

(65) Prior Publication Data
US 2006/0247135 A1 Nov. 2, 2006

(51) Int. Cl.
*C09K 8/00* (2006.01)
*E21B 43/16* (2006.01)

(52) U.S. Cl. .................. 507/213; 507/209; 507/211; 166/305.1

(58) Field of Classification Search ............... 507/213, 507/211, 209
See application file for complete search history.

(56) References Cited

U.S. PATENT DOCUMENTS

| | | | |
|---|---|---|---|
| 2,238,671 A | 4/1941 | Woodhouse | |
| 2,703,316 A | 3/1955 | Palmer | |
| 3,173,484 A | 3/1965 | Huitt et al. | |
| 3,195,635 A | 7/1965 | Fast | |
| 3,272,650 A | 9/1966 | MacVittie | |
| 3,302,719 A | 2/1967 | Fischer | |
| 3,364,995 A | 1/1968 | Atkins et al. | |
| 3,366,178 A | 1/1968 | Malone et al. | |
| 3,455,390 A | 7/1969 | Gallus | |
| 3,668,137 A * | 6/1972 | Gardner ................ | 507/242 |
| 3,784,585 A | 1/1974 | Schmitt et al. | |
| 3,819,525 A | 6/1974 | Hattenbrun | |
| 3,828,854 A | 8/1974 | Templeton et al. | |
| 3,836,465 A | 9/1974 | Rhudy et al. | |
| 3,868,998 A | 3/1975 | Lybarger et al. | |
| 3,912,692 A | 10/1975 | Casey et al. | |
| 3,948,672 A | 4/1976 | Harnsberger | |
| 3,955,993 A | 5/1976 | Curtice | |
| 3,960,736 A | 6/1976 | Free et al. | |
| 3,968,840 A | 7/1976 | Tate | |
| 3,986,355 A | 10/1976 | Klaeger | |
| 3,998,272 A | 12/1976 | Maly | |
| 3,998,744 A | 12/1976 | Arnold et al. | |
| 4,010,071 A | 3/1977 | Colegrove | |
| 4,068,718 A | 1/1978 | Cooke, Jr. et al. | |
| 4,169,798 A | 10/1979 | DeMartino | |
| 4,172,066 A | 10/1979 | Zweigle et al. | |
| 4,261,421 A | 4/1981 | Watanabe | |
| 4,265,673 A | 5/1981 | Pace et al. | |
| 4,299,825 A | 11/1981 | Lee | |
| 4,387,769 A | 6/1983 | Erbstoesser et al. | |
| 4,460,052 A | 7/1984 | Gockel | |
| 4,470,915 A | 9/1984 | Conway | |
| 4,498,995 A | 2/1985 | Gockel | |
| 4,502,540 A | 3/1985 | Byham | |
| 4,506,734 A | 3/1985 | Nolte | |
| 4,521,316 A | 6/1985 | Sikorski | |
| 4,526,695 A | 7/1985 | Erbstoesser et al. | |
| 4,614,236 A * | 9/1986 | Watkins et al. ............... | 166/304 |
| 4,632,876 A | 12/1986 | Laird et al. | |
| 4,694,905 A | 9/1987 | Armbruster | |
| 4,703,797 A * | 11/1987 | Djabbarah ................ | 166/252.1 |
| 4,715,967 A | 12/1987 | Bellis | |
| 4,716,964 A | 1/1988 | Erbstoesser et al. | |
| 4,767,706 A | 8/1988 | Levesque | |
| 4,772,346 A | 9/1988 | Anderson et al. | |
| 4,784,694 A | 11/1988 | Lemanczyk et al. ......... | 106/203 |
| 4,785,884 A | 11/1988 | Armbruster | |
| 4,793,416 A | 12/1988 | Mitchell | |
| 4,797,262 A | 1/1989 | Dewitz | |
| 4,809,783 A | 3/1989 | Hollenbeck et al. | |
| 4,817,721 A | 4/1989 | Pober | |
| 4,822,500 A | 4/1989 | Dobson, Jr. et al. | |
| 4,829,100 A | 5/1989 | Murphey et al. | |
| 4,836,940 A | 6/1989 | Alexander | |
| 4,843,118 A | 6/1989 | Lai et al. | |
| 4,848,467 A | 7/1989 | Cantu et al. | |
| 4,863,980 A | 9/1989 | Cowan et al. | |
| 4,886,354 A | 12/1989 | Welch et al. | |
| 4,894,231 A | 1/1990 | Moreau et al. | |
| 4,957,165 A | 9/1990 | Cantu et al. | |
| 4,961,466 A | 10/1990 | Himes et al. | |
| 4,986,353 A | 1/1991 | Clark et al. | |
| 4,986,354 A | 1/1991 | Cantu et al. | |
| 4,986,355 A | 1/1991 | Casad et al. | |
| 5,034,139 A | 7/1991 | Reid et al. | |
| 5,076,364 A * | 12/1991 | Hale et al. ................ | 166/310 |
| 5,082,056 A | 1/1992 | Tackett, Jr. | |
| 5,142,023 A | 8/1992 | Gruber et al. | |
| 5,152,781 A | 10/1992 | Tang et al. | |
| 5,161,615 A | 11/1992 | Hutchins et al. | |
| 5,175,278 A | 12/1992 | Peik et al. ................ | 536/123 |

(Continued)

FOREIGN PATENT DOCUMENTS

EP 0 146 981 A1 11/1984

(Continued)

OTHER PUBLICATIONS

Gdanski, R.D., "Kinetics of the Tertiary Reaction of HF on Alumino-Silicates", Society of Petroleum Engineers Inc.; SPE31076, Presented at the SPE Formation Damage Symposium, Lafayette, LA, Feb. 14-15, 1996.

(Continued)

*Primary Examiner*—Timothy J Kugel
(74) *Attorney, Agent, or Firm*—Robert A. Kent; Baker Botts LLP

(57) ABSTRACT

Treatment fluids are provided that comprise a gelling agent that comprises scleroglucan and/or diutan.

18 Claims, 2 Drawing Sheets

U.S. PATENT DOCUMENTS

| | | | |
|---|---|---|---|
| 5,203,834 A | 4/1993 | Hutchins et al. | |
| 5,213,446 A | 5/1993 | Dovan | |
| 5,216,050 A | 6/1993 | Sinclair | |
| 5,247,059 A | 9/1993 | Gruber et al. | |
| 5,249,628 A | 10/1993 | Surjaatmadia | |
| 5,251,697 A | 10/1993 | Shuler | |
| 5,295,542 A | 3/1994 | Cole et al. | |
| 5,304,620 A | 4/1994 | Holtmyer et al. | |
| 5,314,031 A | 5/1994 | Hale et al. | |
| 5,325,923 A | 7/1994 | Surjaatmadja et al. | |
| 5,330,005 A | 7/1994 | Card et al. | |
| 5,359,026 A | 10/1994 | Gruber | |
| 5,360,068 A | 11/1994 | Sprunt et al. | |
| 5,363,916 A | 11/1994 | Himes et al. | |
| 5,373,901 A | 12/1994 | Norman et al. | |
| 5,386,874 A | 2/1995 | Laramay et al. | |
| 5,396,957 A | 3/1995 | Surjaatmadja et al. | |
| 5,402,846 A | 4/1995 | Jennings, Jr. et al. | |
| 5,439,055 A | 8/1995 | Card et al. | |
| 5,460,226 A | 10/1995 | Lawton et al. | |
| 5,464,060 A | 11/1995 | Hale et al. | |
| 5,475,080 A | 12/1995 | Gruber et al. | |
| 5,484,881 A | 1/1996 | Gruber et al. | |
| 5,487,897 A | 1/1996 | Polson et al. | |
| 5,492,177 A | 2/1996 | Yeh et al. | |
| 5,496,557 A | 3/1996 | Feijen et al. | |
| 5,497,830 A | 3/1996 | Boles et al. | |
| 5,499,678 A | 3/1996 | Surjaatmadja et al. | |
| 5,501,276 A | 3/1996 | Weaver et al. | |
| 5,505,787 A | 4/1996 | Yamaguchi | |
| 5,512,071 A | 4/1996 | Yam et al. | |
| 5,536,807 A | 7/1996 | Gruber et al. | |
| 5,555,936 A | 9/1996 | Pirri et al. | |
| 5,591,700 A | 1/1997 | Harris et al. | |
| 5,594,095 A | 1/1997 | Gruber et al. | |
| 5,602,083 A | 2/1997 | Gabrysch et al. | |
| 5,604,186 A | 2/1997 | Hunt et al. | |
| 5,607,905 A | 3/1997 | Dobson, Jr. et al. | |
| 5,613,558 A | 3/1997 | Dillenbeck | |
| 5,670,473 A | 9/1997 | Scepanski | |
| 5,697,440 A | 12/1997 | Weaver et al. | |
| 5,698,322 A | 12/1997 | Tsai et al. | |
| 5,723,416 A | 3/1998 | Liao | |
| 5,765,642 A | 6/1998 | Surjaatmadja | |
| 5,783,527 A | 7/1998 | Dobson, Jr. et al. | |
| 5,791,415 A | 8/1998 | Nguyen et al. | |
| 5,799,734 A | 9/1998 | Norman et al. | |
| 5,833,000 A | 11/1998 | Weaver et al. | |
| 5,849,401 A | 12/1998 | El-Afandi et al. | |
| 5,853,048 A | 12/1998 | Weaver et al. | |
| 5,893,416 A | 4/1999 | Read | |
| 5,908,073 A | 6/1999 | Nguyen et al. | |
| 5,916,849 A | 6/1999 | House | |
| 5,924,488 A | 7/1999 | Nguyen et al. | |
| 5,964,291 A | 10/1999 | Bourne et al. | |
| 5,977,030 A | 11/1999 | House | |
| 5,979,557 A | 11/1999 | Card et al. | |
| 5,996,693 A | 12/1999 | Heathman | |
| 6,004,400 A | 12/1999 | Bishop et al. | |
| 6,024,170 A | 2/2000 | McCabe et al. | |
| 6,028,113 A | 2/2000 | Scepanski | |
| 6,047,772 A | 4/2000 | Weaver et al. | |
| 6,110,875 A | 8/2000 | Tjon-Joe-Pin et al. | |
| 6,114,410 A | 9/2000 | Betzold | |
| 6,123,159 A | 9/2000 | Brookey et al. | |
| 6,123,965 A | 9/2000 | Jacob et al. | |
| 6,131,661 A | 10/2000 | Conner et al. | |
| 6,135,987 A | 10/2000 | Tsai et al. | |
| 6,143,698 A | 11/2000 | Murphey et al. | |
| 6,148,917 A | 11/2000 | Brookey et al. | |
| 6,162,766 A | 12/2000 | Muir et al. | |
| 6,169,058 B1 | 1/2001 | Le et al. | |
| 6,172,011 B1 | 1/2001 | Card et al. | |
| 6,189,615 B1 | 2/2001 | Sydansk | |
| 6,202,751 B1 | 3/2001 | Chatterji et al. | |
| 6,209,643 B1 | 4/2001 | Nguyen et al. | |
| 6,209,646 B1 | 4/2001 | Reddy et al. | |
| 6,214,773 B1 | 4/2001 | Harris et al. | |
| 6,242,390 B1 | 6/2001 | Mitchell et al. | |
| 6,260,622 B1 | 7/2001 | Blok et al. | |
| 6,291,013 B1 | 9/2001 | Gibson et al. | |
| 6,300,286 B1 | 10/2001 | Dobson, Jr. et al. | |
| 6,302,209 B1 | 10/2001 | Thompson et al. | |
| 6,308,788 B1 | 10/2001 | Patel et al. | |
| 6,311,773 B1 | 11/2001 | Todd et al. | |
| 6,315,045 B1 | 11/2001 | Brezinski | 166/300 |
| 6,323,307 B1 | 11/2001 | Bigg et al. | |
| 6,326,458 B1 | 12/2001 | Gruber et al. | |
| 6,328,105 B1 | 12/2001 | Betzold | |
| 6,330,917 B2 | 12/2001 | Chatterji et al. | |
| 6,357,527 B1 | 3/2002 | Norman et al. | |
| 6,364,945 B1 | 4/2002 | Chatterji et al. | |
| 6,380,138 B1 | 4/2002 | Ischy et al. | |
| 6,387,986 B1 | 5/2002 | Moradi-Araghi et al. | |
| 6,390,195 B1 | 5/2002 | Nguyen et al. | |
| 6,394,185 B1 | 5/2002 | Constien | |
| 6,422,314 B1 | 7/2002 | Todd et al. | |
| 6,422,326 B1 | 7/2002 | Brookey et al. | |
| 6,432,155 B1 | 8/2002 | Swazey et al. | |
| 6,454,003 B1 | 9/2002 | Chang et al. | |
| 6,485,947 B1 | 11/2002 | Rajgarhia et al. | |
| 6,488,763 B2 | 12/2002 | Brothers et al. | |
| 6,494,263 B2 | 12/2002 | Todd | |
| 6,508,305 B1 | 1/2003 | Brannon et al. | |
| 6,509,301 B1 | 1/2003 | Vollmer et al. | |
| 6,525,011 B2 | 2/2003 | Brezinski | 510/253 |
| 6,527,051 B1 | 3/2003 | Reddy et al. | |
| 6,534,448 B1 | 3/2003 | Brezinski | 507/90 |
| 6,554,071 B1 | 4/2003 | Reddy et al. | |
| 6,566,310 B2 | 5/2003 | Chan | |
| 6,569,814 B1 | 5/2003 | Brady et al. | |
| 6,578,630 B2 | 6/2003 | Simpson et al. | |
| 6,599,863 B1 | 7/2003 | Palmer et al. | |
| 6,667,279 B1 | 12/2003 | Hessert et al. | |
| 6,669,771 B2 | 12/2003 | Tokiwa et al. | |
| 6,681,856 B1 | 1/2004 | Chatterji et al. | |
| 6,686,328 B1 | 2/2004 | Binder | |
| 6,691,780 B2 | 2/2004 | Nguyen et al. | |
| 6,702,023 B1 | 3/2004 | Harris et al. | |
| 6,706,668 B2 | 3/2004 | Brezinski | 507/269 |
| 6,710,019 B1 | 3/2004 | Sawdon et al. | |
| 6,716,797 B2 | 4/2004 | Brookey | |
| 6,737,385 B2 | 5/2004 | Todd et al. | |
| 6,761,218 B2 | 7/2004 | Nguyen et al. | |
| 6,763,888 B1 | 7/2004 | Harris et al. | |
| 6,764,981 B1 | 7/2004 | Eoff et al. | |
| 6,767,869 B2 | 7/2004 | DiLullo et al. | |
| 6,793,018 B2 | 9/2004 | Dawson et al. | |
| 6,793,730 B2 | 9/2004 | Reddy et al. | |
| 6,806,235 B1 | 10/2004 | Mueller et al. | |
| 6,817,414 B2 | 11/2004 | Lee | |
| 6,818,594 B1 | 11/2004 | Freeman et al. | |
| 6,837,309 B2 | 1/2005 | Boney et al. | |
| 6,840,318 B2 | 1/2005 | Lee et al. | |
| 6,852,173 B2 | 2/2005 | Banerjee et al. | |
| 6,861,394 B2 | 3/2005 | Ballard et al. | |
| 6,883,608 B2 | 4/2005 | Parlar et al. | |
| 6,886,635 B2 | 5/2005 | Hossaini et al. | |
| 6,896,058 B2 | 5/2005 | Munoz, Jr. et al. | |
| 6,904,971 B2 | 6/2005 | Brothers et al. | |
| 6,949,491 B2 | 9/2005 | Cooke, Jr. | |
| 6,959,767 B2 | 11/2005 | Horton et al. | |
| 6,978,838 B2 | 12/2005 | Parlar et al. | |
| 6,981,552 B2 | 1/2006 | Reddy et al. | |

| | | |
|---|---|---|
| 6,983,801 B2 | 1/2006 | Dawson et al. |
| 6,987,083 B2 | 1/2006 | Phillippi et al. |
| 6,997,259 B2 | 2/2006 | Nguyen |
| 7,000,701 B2 | 2/2006 | Todd et al. |
| 7,007,752 B2 | 3/2006 | Reddy et al. |
| 7,021,377 B2 | 4/2006 | Todd et al. |
| 7,032,663 B2 | 4/2006 | Nguyen |
| 7,036,586 B2 | 5/2006 | Roddy et al. |
| 7,036,587 B2 | 5/2006 | Munoz, Jr. et al. |
| 7,044,220 B2 | 5/2006 | Nguyen et al. |
| 7,044,224 B2 | 5/2006 | Nguyen |
| 7,049,272 B2 | 5/2006 | Sinclair et al. |
| 7,063,151 B2 | 6/2006 | Nguyen et al. |
| 7,066,258 B2 | 6/2006 | Justus et al. |
| 7,066,260 B2 | 6/2006 | Sullivan et al. |
| 7,069,994 B2 | 7/2006 | Cooke, Jr. |
| 7,080,688 B2 | 7/2006 | Todd et al. |
| 7,093,664 B2 | 8/2006 | Todd et al. |
| 7,096,947 B2 | 8/2006 | Todd et al. |
| 7,101,829 B2 | 9/2006 | Guichard et al. |
| 7,131,491 B2 | 11/2006 | Blauch et al. |
| 7,132,389 B2 | 11/2006 | Lee |
| 7,140,438 B2 | 11/2006 | Frost et al. |
| 7,147,067 B2 | 12/2006 | Getzlaf et al. |
| 7,151,077 B2 | 12/2006 | Prud'homme et al. |
| 7,153,902 B2 | 12/2006 | Altes et al. |
| 7,156,174 B2 | 1/2007 | Roddy et al. |
| 7,165,617 B2 | 1/2007 | Lord et al. |
| 7,166,560 B2 | 1/2007 | Still et al. |
| 7,168,489 B2 | 1/2007 | Frost et al. |
| 7,172,022 B2 | 2/2007 | Reddy et al. |
| 7,178,596 B2 | 2/2007 | Blauch et al. |
| 7,195,068 B2 | 3/2007 | Todd |
| 7,204,312 B2 | 4/2007 | Roddy et al. |
| 7,205,264 B2 | 4/2007 | Boles |
| 7,216,705 B2 | 5/2007 | Saini et al. |
| 7,219,731 B2 | 5/2007 | Sullivan |
| 7,228,904 B2 | 6/2007 | Todd et al. |
| 7,261,156 B2 | 8/2007 | Nguyen et al. |
| 7,264,051 B2 | 9/2007 | Nguyen et al. |
| 7,265,079 B2 | 9/2007 | Wilbert et al. |
| 7,267,170 B2 | 9/2007 | Mang et al. |
| 7,276,466 B2 | 10/2007 | Todd et al. |
| 7,299,869 B2 | 11/2007 | Kalman |
| 7,303,014 B2 | 12/2007 | Reddy et al. |
| 7,306,037 B2 | 12/2007 | Nguyen et al. |
| 7,322,412 B2 | 1/2008 | Badalamenti et al. |
| 7,345,013 B2 | 3/2008 | Fraser |
| 2001/0016562 A1 | 8/2001 | Muir et al. |
| 2002/0119169 A1 | 8/2002 | Angel et al. |
| 2003/0054962 A1 | 3/2003 | England et al. |
| 2003/0130133 A1 | 7/2003 | Vollmer |
| 2003/0147965 A1 | 8/2003 | Bassett et al. |
| 2003/0230407 A1 | 12/2003 | Vijn et al. |
| 2003/0234103 A1* | 12/2003 | Lee et al. .................. 166/293 |
| 2004/0014606 A1 | 1/2004 | Parlar et al. |
| 2004/0070093 A1 | 4/2004 | Mathiowitz et al. |
| 2004/0099416 A1 | 5/2004 | Vijn et al. |
| 2004/0138068 A1 | 7/2004 | Rimmer et al. |
| 2004/0170836 A1 | 9/2004 | Bond et al. |
| 2004/0231845 A1 | 11/2004 | Cooke, Jr. |
| 2005/0028976 A1 | 2/2005 | Nguyen |
| 2005/0034861 A1 | 2/2005 | Saini et al. |
| 2005/0059556 A1 | 3/2005 | Munoz et al. |
| 2005/0059557 A1 | 3/2005 | Todd et al. |
| 2005/0059558 A1 | 3/2005 | Blauch et al. |
| 2005/0126785 A1 | 6/2005 | Todd et al. |
| 2005/0130848 A1 | 6/2005 | Todd et al. |
| 2005/0183741 A1 | 8/2005 | Surjaatmadja et al. |
| 2005/0205266 A1 | 9/2005 | Todd et al. |
| 2005/0261138 A1* | 11/2005 | Robb et al. .................. 507/209 |
| 2005/0277554 A1 | 12/2005 | Blauch et al. |
| 2006/0016596 A1 | 1/2006 | Pauls et al. |
| 2006/0032633 A1 | 2/2006 | Nguyen |
| 2006/0046938 A1 | 3/2006 | Harris et al. |
| 2006/0054324 A1 | 3/2006 | Sullivan et al. |
| 2006/0065397 A1 | 3/2006 | Nguyen et al. |
| 2006/0105917 A1 | 5/2006 | Munoz et al. |
| 2006/0105918 A1 | 5/2006 | Munoz et al. |
| 2006/0169182 A1 | 8/2006 | Todd et al. |
| 2006/0169450 A1 | 8/2006 | Mang et al. |
| 2006/0172893 A1 | 8/2006 | Todd et al. |
| 2006/0172894 A1 | 8/2006 | Mang et al. |
| 2006/0172895 A1 | 8/2006 | Mang et al. |
| 2006/0185848 A1 | 8/2006 | Surjaatmadja et al. |
| 2007/0298977 A1 | 12/2007 | Mang et al. |
| 2008/0009423 A1 | 1/2008 | Mang et al. |

FOREIGN PATENT DOCUMENTS

| | | |
|---|---|---|
| EP | 0 510 762 | 10/1992 |
| EP | 0 879 935 | 11/1998 |
| EP | 1 413 710 | 4/2004 |
| FR | 2 570 753 | 9/1984 |
| FR | 2 570 754 | 9/1984 |
| FR | 2 570 755 | 9/1984 |
| FR | 2 570 756 | 9/1984 |
| FR | 2 600 664 A1 | 6/1986 |
| GB | 2 412 389 | 3/2004 |
| JP | 2004181820 A | 7/2004 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 00/57022 | 9/2000 |
| WO | WO 01/02698 | 1/2001 |
| WO | WO 01/87797 | 11/2001 |
| WO | WO 01/94744 | 12/2001 |
| WO | WO 02/55843 | 1/2002 |
| WO | WO 02/12674 | 2/2002 |
| WO | WO 03/027431 | 4/2003 |
| WO | WO 2004/007905 | 1/2004 |
| WO | WO 2004/037946 | 5/2004 |
| WO | WO 2004/038176 | 5/2004 |

OTHER PUBLICATIONS

Vandamme, E.J., et al., "Polysaccharides II: Polysaccharides from Eukaryotes", *Biopolymers*, ISBN: 3-527-30227-1, vol. 6, Chapters 2 and 3, 2002.

Falch, B.H., et al., *Biopolymers*, vol. 50, p. 496, 1999.

Diltz, et al., "Location of O-acetyle Groups in S-657 Using the Reductive-Cleavage Method", *Carbohydrate Research*, vol. 331, p. 265-270, 2001.

Simmons, et al., *Poly(phenyllactide): Synthesis, Characterization, and Hydrolytic Degradation*, Biomacromolecules, vol. 2, No. 2, 2001 (pp. 658-663).

Yin, et al., *Preparation and Characterization of Substituted Polylactides*, American Chemical Society, vol. 32, No. 23, 1999 (pp. 7711-7718).

Yin, et al., *Synthesis and Properties of Polymers Derived form Substituted Lactic Acids*, American Chemical Society, Ch. 12, 2001 (pp. 147-159).

Cantu, et al, *Laboratory and Field Evaluation of a Combined Fluid-Loss-Control Additive and Gel Breaker for Fracturing Fluids*, SPE 18211, Society of Petroleum Engineers, 1990.

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.

Albertsson, et al, *Aliphatic Polyesters: Systhesis, Properties and Applications*, Advances in Polymer Science, vol. 157, Degradable Aliphatic Polyesters, 2002.

Dechy-Cabaret, et al, *Controlled Ring-Opening Polymerization of Lactide and Glycolide*, American Chemical Society, Chemical Reviews, A-Z, AA-AD, received 2004.

Funkhouser, et al, *Synthetic Polymer Fracturing Fluid for High-Temperature Applications*, SPE 80236, Society of Petroleum Engineers, 2003.

*Chelating Agents*, Encyclopedia of Chemical Technology, vol. 5 (764-795).

Vichaibun, et al, *A New Assay for the Enzymatic Degradation of Polylactic Acid, Short Report*, ScienceAsia, vol. 29, 2003 (pp. 297-300).

Halliburton, *SurgiFrac$^{SM}$ Service, A Quick and Cost-Effective Method to Help Boost Production From Openhole Horizontal Completions*, Halliburton Communications, HO3297, 2002.

Halliburton, *Cobra Frac$^{SM}$ Service, Coiled Tubing Fracturing—Cost-Effective Method for Stimulating Untapped Reserves*, HO2319R, Halliburton Energy Services, 2000.

Halliburton, *CobraJet Frac$^{SM}$ Service, Cost-effective Technology That Can Help Reduce Cost Per BOE Produced, Shorten Cycle Time and Reduce Capex*, Halliburton Communications.

Y. Chiang et al., *Hydrolysis Of Ortho Esters; Further Investigation Of The Factors Which Control The Rate-Determining Step*, Engineering Information, Inc. NY, NY, vol. 105, No. 23 (XP-002322842), Nov. 16, 1983.

M. Ahmad, et al., *Ortho Ester Hydrolysis: Direct Evidence For A Three-Stage Reaction Mechanism*, Engineering Information, Inc. NY, NY, vol. 101, No. 10 (XP-002322843), May 9, 1979.

Skrabel et al, *The Hydrolysis Rate Of Orthoformic Acid Ethyl Ether*, Chemical Institute of the University of Graz, Jan. 13, 1921, pp. 1-38.

Heller, et al., *Poly(ortho esters)—From Concept To Reality*, Biomacromolecules, vol. 5, No. 5, 2004 (pp. 1625-1632), May 9, 1979.

Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).

Ng, et al., *Synthesis and Erosion Studies of Self-Catalyzed Poly(ortho ester)s*, American Chemical Society, vol. 30, No. 4, 1997 (pp. 770-772).

Ng, et al., *Development Of A Poly(ortho ester) prototype With A Latent Acid In The Polymer Backbone For 5-fluorouracil Delivery*, Journal of Controlled Release 65 (2000), (pp. 367-374).

Rothen-Weinhold, et al., *Release of BSA from poly(ortho ester) extruded thin strands*, Journal of Controlled Release 71, 2001, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) For The Pulsed And Continuous Delivery of Peptides And Proteins*, Controlled Release and Biomedical Polymers Department, SRI International, (pp. 39-46).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug. 1981, vol. 21, No. 11 (pp. 727-731).

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., *A Chemical "Trigger" Useful for Oilfield Applications*, Society of Petroleum Engineers, Inc., SPE 92709, Feb. 4, 2005.

Kiyoshi Matsuyama et al, Environmentally benign formation of polymeric microspheres by rapid expansion of supercritical carbon dioxide solution with a nonsolvent, Environ Sci Technol 2001, 35, 4149-4155.

Office action dated Dec. 6, 2007 from U.S. Appl. No. 11/118,028.
Office action dated May 1, 2007 from U.S. Appl. No. 11/118,028.
Office action dated Jan. 12, 2007 from U.S. Appl. No. 10/889,860.
Office action dated Jul. 6, 2007 from U.S. Appl. No. 10/889,860.
Foreign communication related to a counterpart application dated Oct. 9, 2006.
U.S. Appl. No. 11/118,028, filed Apr. 29, 2005, Welton, et al.
Office Action dated Jun. 12, 2008 from U.S. Appl. No. 11/118,028.
Office Action for U.S. Appl. No. 11/118,028, dated Dec. 8, 2008.

* cited by examiner

ACIDIC TREATMENT FLUIDS COMPRISING SCLEROGLUCAN AND/OR DIUTAN AND ASSOCIATED METHODS

CROSS-REFERENCE TO A RELATED APPLICATION

This application is related to, application Ser. No. 11/118,028, currently pending, filed on Apr. 29, 2005.

BACKGROUND

The present invention relates to acidic treatment fluids used in industrial and oil field operations, and more particularly, to acidic treatment fluids comprising gelling agents that comprise scleroglucan and/or diutan, and their use in industrial and oil field operations. As used herein, the term "treatment fluid" refers to any fluid that may be used in a subterranean application in conjunction with a desired function and/or for a desired purpose. The term "treatment fluid" does not imply any particular action by the fluid or any component thereof.

Acidizing and fracturing procedures using acidic treatment fluids are commonly carried out in subterranean well formations to accomplish a number of purposes including, but not limited to, to facilitate the recovery of desirable hydrocarbons from the formation. One commonly used aqueous acidic treatment fluid comprises hydrochloric acid. Other commonly used acids for acidic treatment fluids include: hydrofluoric acid, acetic acid, formic acid, citric acid, ethylene diamine tetra acetic acid ("EDTA"), glycolic acid, sulfamic acid, and derivatives or combinations thereof.

Acidic treatment fluids are used in various subterranean operations. For example, formation acidizing or "acidizing" is a well known method for increasing the flow of desirable hydrocarbons from a subterranean formation. In a matrix acidizing procedure, an aqueous acidic treatment fluid is introduced into a subterranean formation via a well bore therein under pressure so that the acidic treatment fluid flows into the pore spaces of the formation and reacts with the acid-soluble materials therein. As a result, the pore spaces of that portion of the formation are enlarged, and consequently, the permeability of the formation should increase. The flow of hydrocarbons from the formation is therefore increased because of the increase in formation conductivity caused, inter alia, by dissolution of the formation material. In fracture acidizing procedures, one or more fractures are produced in the formations and an acidic treatment fluid is introduced into the fracture(s) to etch flow channels therein. Acidic treatment fluids also may be used to clean out well bores to facilitate the flow of desirable hydrocarbons. Other acidic treatment fluids may be used in diversion processes, and well bore clean-out processes. A specific example is filter cake removal.

To increase the viscosity of an aqueous acid treatment fluid, a suitable gelling agent may be included in the treatment fluid (often referred to as "gelling" the fluid). Gelling an aqueous acidic treatment fluid may be useful to prevent the acid from becoming prematurely spent and inactive. Additionally, gelling an aqueous acidic treatment fluid may enable the development of wider fractures so that live acid may be forced further into the formation from the well bore. Gelling the acidic treatment fluid may delay the interaction of the acid with an acid soluble component in the well bore or the formation. Moreover, gelling an aqueous acidic treatment fluid may permit better fluid loss control of the fluid.

Acidic treatment fluids used in subterranean operations are predominantly water-based fluids that comprise gelling agents that may increase their viscosities, inter alia, to provide viscosity to control the rate of spending of the acid. These gelling agents are usually biopolymers or synthetic polymers that, when hydrated and at a sufficient concentration, are capable of forming a more viscous fluid. Common gelling agents include polysaccharides (such as xanthan), synthetic polymers (such as polyacrylamide), and surfactant gel systems. Acidic treatment fluids comprising xanthan generally have sufficient viscosity for lower temperature operations. At elevated temperatures (e.g., those above about 120° F. to about 150° F.), however, the viscosity of such xanthan treatment fluids are diminished. Consequently, xanthan may not be a suitable gelling agent for acidic treatment fluids when those fluids are used in well bores that comprise elevated temperatures. Other gelling agents such as synthetic gelling agents (e.g., polyacrylamides) have been used, but they are often difficult to disperse and usually require considerable mixing or agitation to develop full viscosity. Additionally, most conventional gelling agents, including guar and some synthetic polymers, may form acid insoluble residues. Moreover, surfactant gel systems can be expensive, and are often sensitive to impurities. Also, surfactant gel systems often require hydrocarbon breakers.

SUMMARY OF THE INVENTION

The present invention relates to acidic treatment fluids used in industrial and oil field operations, and more particularly, to acidic treatment fluids comprising gelling agents that comprise scleroglucan and/or diutan, and their use in industrial and oil field operations.

In another embodiment, the present invention provides a subterranean well treatment system comprising an acidic treatment fluid that comprises an aqueous base fluid, an acid, and a gelling agent that comprising scleroglucan and/or diutan.

In another embodiment, the present invention provides an acidic treatment fluid comprising a gelling agent that comprises scleroglucan and/or diutan.

The features and advantages of the present invention will be readily apparent to those skilled in the art upon a reading of the description of the preferred embodiments that follows.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
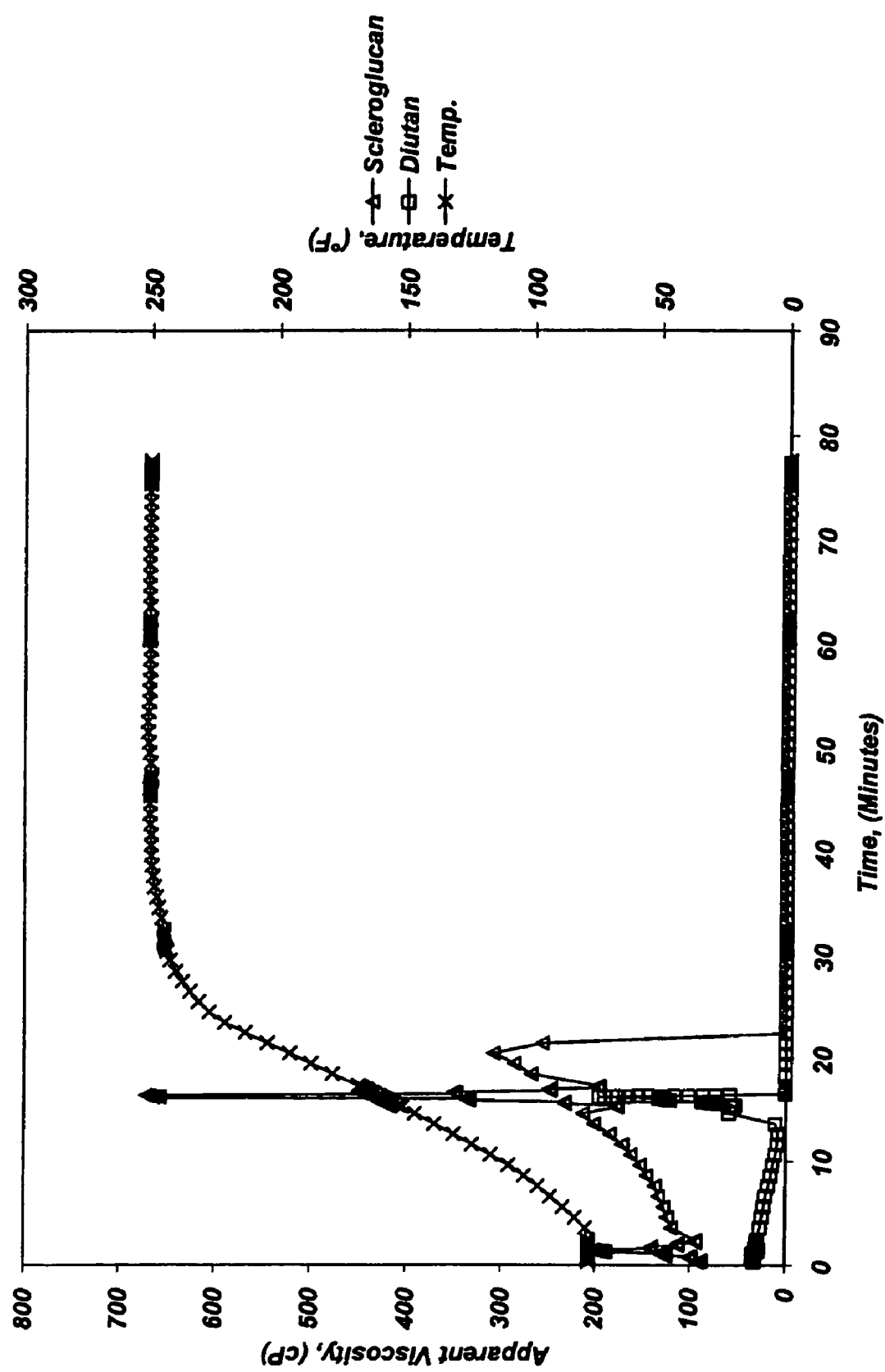
FIG. 1 illustrates viscosity data from an experiment involving an embodiment of the present invention.

The present invention relates to acidic treatment fluids used in industrial and oil field operations, and more particularly, to acidic treatment fluids comprising gelling agents that comprise scleroglucan and/or diutan, and their use in industrial and oil field operations. Such operations may involve the removal of scale, fracture acidizing, matrix acidizing, diversion, filter cake removal, or pill removal.

In certain embodiments, the present invention provides fluids and methods that are especially suitable for use in well bores comprising a borehole temperature ("BHT") of up to about 500° F. A preferred temperature range is a treating temperature below about 250° F. One should note that the ability of the acidic treatment fluids of the present invention to maintain a degree of viscosity at such elevated temperatures may be affected by the time a particular fluid is exposed to such temperatures. For example, in some fracture acidizing applications, there may be a considerable fracture cool-down, which may enable utilization of an acidic treatment fluid of the present invention at BHT above the temperature limit at which the fluid demonstrates viscosity. One of the many advantages of the gelling agents of the present invention is that they typically do not leave undesirable residues in the formation once the fluid has been broken. Another advantage is that the gelling agents are environmentally acceptable in some sensitive environments (such as the North Sea). Additionally, the gelling agents of the present invention may present a cost savings over some conventional gelling agents (like many surfactant-based gelling agents) for acidic treatment fluid applications. The acidic treatment fluids of the present invention may be useful in a wide variety of subterranean treatment operations in which acidic treatment fluids may be suitable.

The acidic treatment fluids of the present invention generally comprise an aqueous base fluid, an acid, and a gelling agent of the present invention that comprises scleroglucan and/or diutan. When used in diversion applications, the treatment fluid may or may not comprise an acid. One of ordinary skill in the art with the benefit of this disclosure will be able to determine whether an acid is appropriate. Generally speaking, the fluids of the present invention have a pH of less than about 4. In preferred embodiments comprising hydrochloric acid, the treatment fluids may have a pH of about 1 or less. In embodiments comprising an organic acid, the treatment fluids may have a pH of about 1 to about 4.

The aqueous base fluids of the treatment fluids of the present invention generally comprise fresh water, salt water, or a brine (e.g., a saturated salt water). Other water sources may be used, including those comprising divalent or trivalent cations, e.g., magnesium, calcium, zinc, or iron. Monovalent brines are preferred and, where used, may be of any weight. One skilled in the art will readily recognize that an aqueous base fluid containing a high level of multi-valent ions should be tested for compatibility prior to use. Salts optionally may be added to the water source, inter alia, to produce a treatment fluid having a desired density or other characteristics. One of ordinary skill in the art with the benefit of this disclosure will recognize the particular type of salt appropriate for particular application, given considerations such as protection of the formation, the presence or absence of reactive clays in the formation adjacent to the well bore, compatibility with the other acidic treatment fluid additives, and the factors affecting wellhead control. A wide variety of salts may be suitable. Examples of suitable salts include, inter alia, potassium chloride, sodium bromide, ammonium chloride, cesium formate, potassium formate, sodium formate, sodium nitrate, calcium bromide, zinc bromide, and sodium chloride. A preferred aqueous base fluid is a 5% ammonium chloride brine with hydrofluoric acid or an organic acid. An artisan of ordinary skill with the benefit of this disclosure will recognize the appropriate concentration of a particular salt to achieve a desired density given factors such as the environmental regulations that may pertain. Also, the composition of the water used also will dictate whether and what type of salt is appropriate. The amount of the base fluid in an acidic treatment fluid of the present invention will vary depending on the purpose of the fluid, the formation characteristics, and whether the fluid will be foamed.

Suitable acids for inclusion in the treatment fluids of the present invention include any acid suitable for use in a subterranean application. Examples include hydrochloric acid, hydrofluoric acid, acetic acid, formic acid, citric acid, ethylene diamine tetra acetic acid ("EDTA"), glycolic acid, sulfamic acid, and derivatives or a combination thereof. Hydrochloric acid, acetic acid, or formic acid may be preferred in certain applications. One should note that the choice of aqueous base fluid and acid should be chosen vis-à-vis the other so that the proper synergistic effect is achieved. The concentration and type of acid selected may be based upon the function of the acid (e.g., scale removal, fracture acidizing, matrix acidizing, removal of fluid loss filter cakes and pills, and the like) and the mineralogy of the formation. It is well known that certain concentrations of acids will form precipitates upon spending. See Gdanski, R. D.: "Kinetics of the Tertiary Reaction of HF on Alumino-Silicates", SPE 31076 presented at the SPE Formation Damage Symposium, Lafayette, La., Feb. 14-15, 1996. Such tendency to form precipitates should be taken into consideration when choosing an acid. A precipitation control additive (e.g., aluminum chloride) may be desirable to include as well depending on the acid and the formation.

The gelling agents of the present invention may comprise scleroglucan and/or diutan. The gelling agent may be present in an acidic treatment fluid of the present invention in an amount of from about 10 lb/Mgal to about 200 lb/Mgal. Generally speaking, an acidic treatment fluid containing an organic acid may require less of a gelling agent of the present invention than an acidic treatment fluid containing hydrochloric acid.

As noted in the text BIOPOLYMERS, VOLUME 6, POLYSACCHARIDES II: POLYSACCHARIDES FROM EUKARYOTES, by E. J. Vandamme (Editor), S. De Baets (Editor), Alexander Steinbüchel (Editor), ISBN: 3-527-30227-1; published by Wiley 2002, specifically Chapters 2 and 3, scleroglucan is a neutral fungal polysaccharide. Scleroglucan is a hydrophilic polymer, which is believed to have a tendency to thicken and stabilize water-based systems by conferring on them a relatively high viscosity, generally higher than that obtained in the case of xanthan, for example, at temperatures at or above about 200° F., for identical concentrations of active compounds. Scleroglucan also appears to be more resistant to pH and temperature changes than xanthan, and therefore, may impart more stable viscosity in such conditions. In certain aspects, the viscosity of a scleroglucan fluid may be virtually independent of pH between a pH of about 1 and about 12.5 up to a temperature limit of about 270° F. Generally, the main backbone polymer chain of scleroglucan comprises (1→3)β-D-glucopyranosyl units with a single β-D-glucopyranosyl group attached to every third unit on the backbone. Scleroglucan is thought to be resistant to degradation, even at high temperatures such as those at or above about 200° F., even after, e.g., 500 days in seawater. Viscosity data (see Table 1 and Table 2) show that dilute solutions (e.g., about 0.5%) may be shear thinning and stable to at least 250° F. Note that these solutions are not acidic. These viscosities illustrate, inter alia, scleroglucan's suitability for viscosifying fluids. In embodiments wherein the gelling agent of the present invention comprises scleroglucan, one may include about 10 to about 200 lb/Mgal scleroglucan. In an acidic treatment fluid that comprises hydrochloric acid, a more preferred range may be from about 40 to about 120 lb/Mgal of scleroglucan.

TABLE 1

Viscosities (cP) of 1% Scleroglucan, Measured at Various Temperatures (° C.) and Shear Rates (s$^{-1}$), using a Brookfield PVS Rheometer

| Shear Rate (s$^{-1}$) | 70° C. | 80° C. | 99° C. | 108° C. | 118° C. | 127° C. |
|---|---|---|---|---|---|---|
| 8.5 | 1500 | 1450 | 1480 | 1460 | 1330 | 1540 |
| 25 | 520 | 540 | 540 | 550 | 500 | — |
| 85 | 180 | 180 | 178 | 175 | 165 | — |
| 170 | 100 | 98 | 99 | 93 | 92 | — |

TABLE 2

Elastic Moduli G' (Pa) Measured Using a Haake RS 150 Controlled Stress Rheometer at 25° C.; Measurements Made at 1 Hz in the Linear Viscoelastic Region.

| | Xanthan | Scleroglucan |
|---|---|---|
| 1.0% | 38 | 35 |
| 0.5% | 9 | 13 |

As noted in the text BIOPOLYMERS, VOLUME 6, POLYSACCHARIDES II: POLYSACCHARIDES FROM EUKARYOTES, by E. J. Vandamme (Editor), S. De Baets (Editor), Alexander Steinbüchel (Editor), ISBN: 3-527-30227-1; published by Wiley 2002, specifically Chapters 2 and 3, and BIOPOLYMERS; (1999) vol 50; p. 496; Authors: B. H. Falch; A. Elgsaeter & B. T. Stokke, diutan gum is a polysaccharide designated as "S-657," which is prepared by fermentation of a strain of *sphingomonas*. Diutan's structure has been elucidated as a hexasaccharide having a tetrasaccharide repeat unit in the backbone that comprises glucose and rhamnose units and di-rhamnose side chain. It is believed to have thickening, suspending, and stabilizing properties in aqueous solutions. Diutan is composed principally of carbohydrates, about 12% protein, and about 7% (calculated as O-acetyl) acyl groups, the carbohydrate portion containing about 19% glucuronic acid, and the neutral sugars rhamnose and glucose in the approximate molar ratio of about 2:1. Details of the diutan gum structure may be found in an article by Diltz et al., "Location of O-acetyl Groups in S-657 Using the Reductive-Cleavage Method," CARBOHYDRATE RESEARCH, Vol. 331, p. 265-270 (2001), which is hereby incorporated by reference in its entirety. Details of preparing diutan gum may be found in U.S. Pat. No. 5,175,278, which is hereby incorporated by reference in its entirety. A suitable source of diutan is "GEOVIS XT," which is commercially available from Kelco Oil Field Group, Houston, Tex. The elastic moduli of some diutan solutions as compared to xanthan solutions are shown in Table 3. Note that these are not acidic solutions. In embodiments wherein the gelling agent of the present invention comprises diutan, one may include about 10 to about 200 lb/Mgal scleroglucan. In an acidic treatment fluid that comprises about 15% hydrochloric acid, a more preferred range may be from about 100 to about 200 lb/Mgal of diutan.

TABLE 3

Elastic Moduli (G') of Diutan and Xanthan Solutions

| Solution Composition | G'(Pa) |
|---|---|
| 0.5% Diutan in water | 15.0 |
| 0.5% Xanthan in water | 11.8 |
| 0.5% Diutan in 6% NaCl | 19.0 |
| 0.5% Xanthan in 6% NaCl | 12.8 |

TABLE 3-continued

Elastic Moduli (G') of Diutan and Xanthan Solutions

| Solution Composition | G'(Pa) |
|---|---|
| 0.75% Diutan in water | 33.0 |
| 0.75% Diutan in 20% KCl | 29.0 |

In some embodiments, the gelling agents may be at least partially crosslinked through a crosslinking reaction comprising a suitable crosslinking agent. Suitable crosslinking agents include zirconium-based crosslinking agents, chrome-based crosslinking agents, and iron-based crosslinking agents. Crosslinking the gelling agent may be desirable where it is desirable to make a certain acidic treatment fluid more viscous. One of ordinary skill in the art with the benefit of this disclosure will recognize when such crosslinkers are appropriate and what particular crosslinker will be most suitable. Things to take into consideration when choosing a suitable crosslinking agent include the pH range of the fluid, activity of the crosslinking agent, the desired viscosity of the treatment fluid, the temperature sensitivity of the crosslinking agent, and the sheer sensitivity of the fluid in the environment. It should be noted that suitable viscosities could be obtained for acidic treatment fluids that comprise gelling agents that comprise diutan without using crosslinkers. Typically, a crosslinking agent may be included in an amount of from about 0.01 lb/Mgal to about 15 lb/Mgal.

Typical cross-linking agents are transitional metals and/or transition metal complexes such as iron, titanium, chromium and zirconium including reaction products of organic acids including polyfunctional acids including dicarboxylic acids, hydroxy-carboxylic acids, amine-carboxylic acids (including for example acetic acid, oxalic acid, malonic acid, succinic acid, glutaric acid, adipic acid, pimelic acid, suberic acid, azelaic acid, sebacic acid, maleic acid, fumaric acid, lactic acid, aspartic acid, malic acid, mandelic acid, citric acid, and the like). Particularly useful are the hydroxy-carboxylic acids such as lactic, maleic and citric acids. Also useful are the complexes formed with these compounds and ammonia alkyli metals, including methyl amine, propyl amine, diethylamine, triethylene tetramine, isopropyl amine, and the like; and hydroxylamines such as triethanolamine, diethanol amine, and the like. Typical compounds include ferric chloride, titanium lactate, titanium malate, titanium citrate, zirconium lactate, zirconium oxychloride, zirconium hydroxychloride, zirconium citrate, zirconium complex of hydroxyethyl glycine, ammonium zirconium fluoride, zirconium 2-ethylhexanoate, zirconium acetate, zirconium neodecanoate, zirconium acetylacetonate, tetrakis(triethanolamine)zirconate, zirconium carbonate, ammonium zirconium carbonate, zirconyl ammonium carbonate, zirconium lactate, titanium acetylacetonate, titanium ethylacetoacetate, titanium citrate, titanium triethanolamine, ammonium titanium lactate, aluminum citrate, chromium citrate, chromium acetate, chromium propionate, chromium malonate, zirconium malate, ammonium, sodium zirconium lactate, zirconium lactate in combination with isopropylamine or triethanolamine, mixtures thereof and the like. Also useful is the use of crosslinking retarders include tartaric acid, sodium glucoheptonate, glucono-delta lactone, sodium lignosulfonate, combinations there of, and the like.

In certain embodiments, the acidic treatment fluids of the present invention also may comprise suitable: hydrate inhibitor, corrosion inhibitors, pH control additives, surfactants, breakers, fluid loss control additives, scale inhibitors, asphaltene inhibitors, paraffin inhibitors, salts, foamers, defoamers, emulsifiers, demulsifiers, iron control agents, solvents, mutual solvents, particulate diverters, gas phase, carbon dioxide, nitrogen, other biopolymers, synthetic polymers, friction reducers combinations thereof, or the like. The acidic treatment fluids of the present invention also may include other additives that may be suitable for a given application.

In alternative embodiments, the acidic treatment fluids of the present invention may be foamed. In such embodiments, the acidic treatment fluids also comprise a gas, and a foaming agent. While various gases can be utilized for foaming the acidic treatment fluids of this invention, nitrogen, carbon dioxide, and mixtures thereof are preferred. In examples of such embodiments, the gas may be present in an acidic treatment fluid in an amount in the range of from about 5% to about 95% by volume of the treatment fluid, and more preferably in the range of from about 20% to about 80%. The amount of gas to incorporate into the fluid may be affected by factors including the viscosity of the fluid and wellhead pressures involved in a particular application. Examples of preferred foaming agents that can be utilized to foam and stabilize the acidic treatment fluids of this invention include, but are not limited to, alkylamidobetaines such as cocoamidopropyl betaine, alpha-olefin sulfonate, trimethyltallowammonium chloride, $C_8$ to $C_{22}$ alkylethoxylate sulfate and trimethylcocoammonium chloride. Cocoamidopropyl betaine is especially preferred. Other suitable surfactants available from Halliburton Energy Services include: "19N," "G-Sperse Dispersant," "Morflo III®" surfactant, "Hyflo (R) IV M" surfactant, "Pen-88M™" surfactant, "HC-2 Agent," "Pen-88 HT™" surfactant, "SEM-7™" emulsifier, "Howco-Suds™" foaming agent, "Howco Sticks™" surfactant, "A-Sperse™" Dispersing aid for acid additives, "SSO-21E" surfactant, and "SSO-21MW™" surfactant. Other suitable foaming agents and foam stabilizing agents may be included as well, which will be known to those skilled in the art with the benefit of this disclosure. The foaming agent is generally present in an acidic treatment fluid of the present invention in an amount in the range of from about 0.1% to about 2.0% by weight, more preferably in the amount of from about 0.2% to about 1.0% and most preferably about 0.6%.

Examples of suitable corrosion inhibitors include acetylenic alcohols, Mannich condensation products (such as those formed by reacting an aldehyde, a carbonyl containing compound and a nitrogen containing compound), unsaturated carbonyl compounds, unsaturated ether compounds, formamide, formic acid, formates, other sources of carbonyl, iodides, terpenes, and aromatic hydrocarbons, coffee, tobacco, gelatin, cinnamaldehyde, cinnamaldehyde derivatives, acetylenic alcohols, fluorinated surfactants, quaternary derivatives of heterocyclic nitrogen bases, quaternary derivatives of halomethylated aromatic compounds, formamides, combinations of such compounds used in conjunction with iodine; quaternary ammonium compounds; and combinations thereof. Suitable corrosion inhibitors and intensifiers are available from Halliburton Energy Services and include: "MSA-II™" corrosion inhibitor, "MSA-III" corrosion inhibitor, "HAI-25 E+" environmentally friendly low temp corrosion inhibitor, "HAI-404™" acid corrosion inhibitor, "HAI-50™" Inhibitor, "HAI-60™" Corrosion inhibitor, "HAI-62™" acid corrosion inhibitor, "HAI-65™" Corrosion inhibitor, "HAI-72E+™" Corrosion inhibitor, "HAI-75™" High temperature acid inhibitor, "HAI-81M™" Acid corrosion inhibitor, "HAI-85™" Acid corrosion inhibitor, "HAI-85M™" Acid corrosion inhibitor, "HAI-202 Environmental Corrosion Inhibitor," "HAI-OS" Corrosion Inhibitor, "HAI-GE" Corrosion Inhibitor, "FDP-S692-03" Corrosion inhibitor for organic acids, "FDP-S656AM-02" and "FDP-S656BW-02" Environmental Corrosion Inhibitor System, "HII-500" Corrosion inhibitor intensifier, "HII-500M" Corrosion inhibitor intensifier, "HII-124" Acid inhibitor intensifier, "HII-124B" Acid inhibitor intensifier, "HII-124C™" Inhibitor intensifier, and "HII-124F™" corrosion inhibitor intensifier. Suitable iron control agents are available from Halliburton Energy Services and include: "Fe-2™" Iron sequestering agent, "FE-2A™" Buffering agent, "FE-3™" Iron control agent, "FE-3A™" Iron control agent, "FE-4™" Iron control agent, "FE-5™" Iron control agent, "FE-5A™" Iron control agent, "FERCHEK®" Ferric iron inhibitor, "FERCHEK®" A "Reducing agent, and "FERCHEK® SC" Iron control process or system. Other suitable iron control agents include those described in U.S. Pat. Nos. 6,315,045, 6,525,011, 6,534,448, and 6,706,668. Examples of corrosion inhibitor activators that may be included include, but are not limited to, cuprous iodide; cuprous chloride; antimony compounds such as antimony oxides, antimony halides, antimony tartrate, antimony citrate, alkali metal salts of antimony tartrate and antimony citrate, alkali metal salts of pyroantimonate and antimony adducts of ethylene glycol; bismuth compounds such as bismuth oxides, bismuth halides, bismuth tartrate, bismuth citrate, alkali metal salts of bismuth tartrate and bismuth citrate; iodine; iodide compounds; formic acid; and mixtures of the foregoing activators such as a mixture of formic acid and potassium iodide. The amount of any corrosion inhibitor to include in an acidic treatment fluid of the present invention will depend on many factors, including but not limited to, the metallurgy the acid will contact, contact time, temperature, etc. Generally, the amount of a corrosion inhibitor to include will range from about 0.1% to about 3% by volume.

Suitable pH control additives, in certain embodiments, may comprise bases, chelating agents, acids, or combinations of chelating agents and acids or bases. A pH control additive may be necessary to maintain the pH of the treatment fluid at a desired level, e.g., to improve the dispersion of the gelling agent in the aqueous base fluid. In some instances, it may be beneficial to maintain the below 3. Suitable pH control additives are those additives that assist in maintaining the pH of an acidic treatment fluid very low, and may include glycolic acids, acetic acids, lactone derivatives, formic acid, carbonic acid, sulfamic acid, and the like.

In some embodiments, the acidic treatment fluids of the present invention may include surfactants, e.g., to improve the compatibility of the acidic treatment fluids with other fluids (like any formation fluids) that may be present in the well bore. Examples of suitable surfactants include ethoxylated nonyl phenol phosphate esters, nonionic surfactants, cationic surfactants, anionic surfactants, amphoteric surfactants, alkyl phosphonate surfactants, linear alcohols, nonylphenol compounds, alkyoxylated fatty acids, alkylphenol alkoxylates, ethoxylated amides, ethoxylated alkyl amines, amphoteric surfactants (such as betaines), and mixtures thereof. Suitable surfactants may be used in a liquid or powder form. In an embodiment where liquid surfactants are used, the surfactants are generally present in an amount in the range of from about 0.01% to about 5.0% by volume of the acidic treatment fluid. In one embodiment, the liquid surfactants are present in an amount in the range of from about 0.1% to about 2.0% by volume of the acidic treatment fluid. In embodiments where powdered surfactants are used, the surfactants may be present in an amount in the range of from about 0.001% to about 0.5% by weight of the acidic treatment fluid. Examples of suitable surfactants are non-emulsifiers commercially available from Halliburton Energy Services, Inc., of Duncan, Okla., under the tradenames "LOSURF-259™" solid surfactant, "LOSURF-300™" nonionic surfactant, "LOSURF-357™" nonionic surfactant, and "LOSURF-400™," surfactant, "LOSURF-2000S™" solid surfactant, and "LOSURF-2000M" solid surfactant, "LOSURF-357" nonionic surfactant, "LOSURF-400" surfactant, "LOSURF-2000S" surfactant, "LOSURF-259" nonionic non-emulsifier, and "LOSURF-300" nonionic surfactant. Another example of a suitable surfactant is a non-emulsifier commercially available from Halliburton Energy Services, Inc., of Duncan, Okla., under the tradename "NEA-96M™" Surfactant. Other examples of suitable surfactants that are commercially available from Halliburton Energy Services in Duncan, Okla. are trade named products "SGA-1," "EFS-1," "EFS-2," "EFS-3," and "EFS-4."

While typically not required, the acidic treatment fluids of the present invention also may comprise breakers capable of reducing the viscosity of the acidic treatment fluid at a desired time. Examples of such suitable breakers for acidic treatment fluids of the present invention include, but are not limited to, sodium chlorite, hypochlorite, perborate, persulfates, peroxides, including organic peroxides. Other suitable breakers include suitable acids. Preferred examples of suitable breakers for acidic treatment fluids of the present invention that include a gelling agent that comprises diutan include peroxide breakers. Preferred examples include tert-butyl hydroperoxide and tert-amyl hydroperoxide. Sodium persulfate and sodium chlorite are not preferred breakers for acidic treatment fluids of the present invention that include a gelling agent that comprises diutan because optimal degradation generally may not occur within a desirable time period. A breaker may be included in an acidic treatment fluid of the present invention in an amount and form sufficient to achieve the desired viscosity reduction at a desired time. The breaker may be formulated to provide a delayed break, if desired. For example, a suitable breaker may be encapsulated if desired. Suitable encapsulation methods are known to those skilled in the art. One suitable encapsulation method that may be used involves coating the chosen breakers with a material that will degrade when downhole so as to release the breaker when desired. Resins that may be suitable include, but are not limited to, polymeric materials that will degrade when downhole. The terms "degrade," "degradation," or "degradable" refer to both the two relatively extreme cases of hydrolytic degradation that the degradable material may undergo, i.e., heterogeneous (or bulk erosion) and homogeneous (or surface erosion), and any stage of degradation in between these two. This degradation can be a result of, inter alia, a chemical or thermal reaction or a reaction induced by radiation. Suitable examples of materials that can undergo such degradation include polysaccharides such as dextran or cellulose; chitins; chitosans; proteins; aliphatic polyesters; poly(lactides); poly (glycolides); poly($\epsilon$-caprolactones); poly(hydroxybutyrates); poly(anhydrides); aliphatic polycarbonates; orthoesters, poly(orthoesters); poly(amino acids); poly(ethylene oxides); and polyphosphazenes. If used, a breaker should be included in a composition of the present invention in an amount sufficient to facilitate the desired reduction in viscosity in a viscosifier treatment fluid. For instance, peroxide concentrations that may be used vary from about 0.1 to about 10 gallons of peroxide per 1000 gallons of the acidic treatment fluid. Optionally, the acidic treatment fluid may contain an activator or a retarder, inter alia, to optimize the break rate provided by the breaker.

To facilitate a better understanding of the present invention, the following examples of certain aspects of some embodiments are given. In no way should the following examples be read to limit, or define, the scope of the invention.

EXAMPLES

Fluid preparation: Acidic treatment fluids comprising scleroglucan were prepared by making a 15% HCl fluid containing 83.5 lb/Mgal of scleroglucan in a Waring blender. The fluid was mixed (hydrated) for 30 minutes. Acidic treatment fluids comprising a diutan gelling agent and a xanthan gelling agent were prepared in a similar manner using 164.9 lb/Mgal and 83.5 lb/Mgal, respectively. A comparative xanthan fluid was prepared using the same process.

Figure 2:
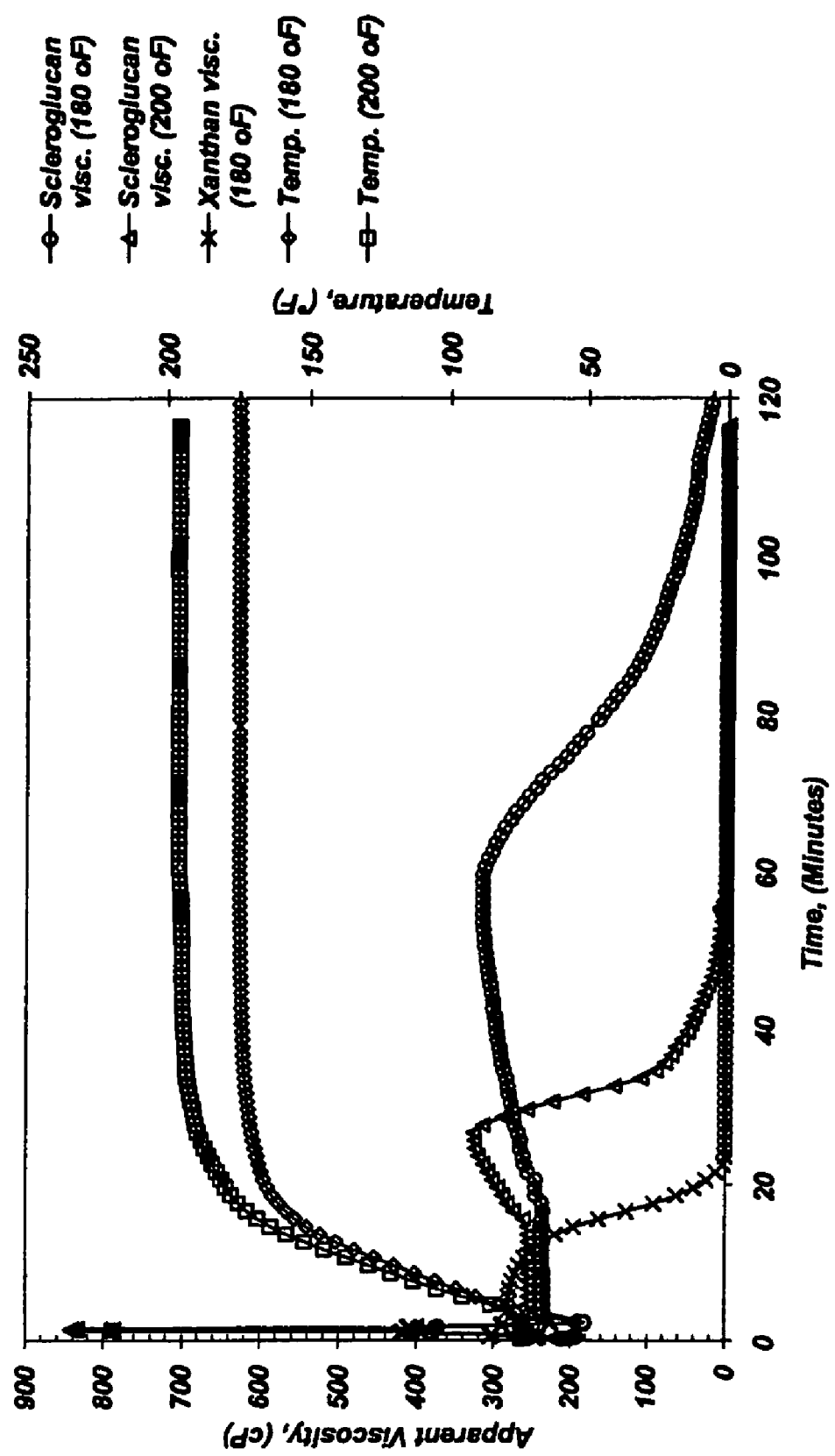
FIG. 2 illustrates the viscosity data from an experiment involving an embodiment of the present invention.

Fluid evaluation: The fluids were then evaluated under two different temperature profiles on a Nordman Model 50 viscometer using a modified API2 test. The results are shown in FIG. 1 and FIG. 2. In FIG. 1, the apparent viscosity is given on the major Y-axis and the sample temperature is given on the minor Y-axis. FIG. 1 demonstrates that fluids comprising a gelling agent that comprises scleroglucan or diutan can maintain higher viscosities at higher temperatures than a fluid comprising a gelling agent that comprises xanthan. Similarly, FIG. 2 demonstrates that a fluid comprising a gelling agent that comprises scleroglucan has a higher viscosity than a fluid that comprises a gelling agent that comprises xanthan.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A subterranean well treatment system comprising an acidic treatment fluid that comprises an aqueous base fluid, an acid, and a gelling agent that comprises diutan, wherein the pH of the acidic treatment fluid is less than about 4.

2. The well treatment system of claim 1 wherein the gelling agent is at least partially crosslinked through a crosslinking reaction that comprises a crosslinking agent.

3. The well treatment system of claim 2 wherein the crosslinking agent comprises at least one of the following: an iron-based compound; a titanium-based compound; a zirconium-based compound; ferric chloride; titanium lactate; titanium malate; titanium citrate; zirconium lactate; zirconium oxychloride; zirconium hydroxychloride; zirconium citrate; a zirconium complex of hydroxyethyl glycine; ammonium zirconium fluoride; zirconium 2-ethylhexanoate; zirconium acetate; zirconium neodecanoate; zirconium acetylacetonate; tetrakis(triethanolamine)zirconate; zirconium carbonate; animonium zirconium carbonate; zirconyl ammonium carbonate; zirconium lactate; titanium acetylacetonate; titanium ethylacetoacetate; titanium citrate; titanium triethanolamine; animonium titanium lactate; aluminum citrate; chromium citrate; chromium acetate; chromium propionate; chromium malonate; zirconium malate; ammonium; sodium zirconium lactate; or zirconium lactate in combination with isopropylamine or triethanol amine.

4. The well treatment system of claim 1 wherein the acidic treatment fluid comprises at least one of the following: fresh water; salt water; a brine; a salt; potassium chloride; sodium bromide; ammonium chloride; cesium formate; potassium formate; sodium formate; sodium nitrate; calcium bromide; zinc bromide; sodium chloride; hydrochloric acid; hydrofluoric acid; acetic acid; formic acid; citric acid; ethylene diamine tetra acetic acid; glycolic acid; or sulfamic acid.

5. The well treatment system of claim 1 wherein the gelling agent is present in the acidic treatment fluid in an amount of from about 10 lb/Mgal to about 200 lb/Mgal.

6. The well treatment system of claim 1 wherein the acidic treatment fluid comprises at least one of the following: a hydrate inhibitor; a corrosion inhibitor; a pH control additive; a surfactant; a breaker; a fluid loss control additive; a scale inhibitor; an asphaltene inhibitor; a paraffin inhibitor; a foaming agent; a defoamer; an emulsifier; a demulsifier; an iron control agent; a solvent; a mutual solvent; a particulate diverter; a gas; carbon dioxide; nitrogen; a biopolymer other than scleroglucan or diutan; a synthetic polymer; or a friction reducer.

7. The well treatment system of claim 1 wherein the acidic treatment fluid comprises a gas in the amount of from about 5% to about 95% by volume.

8. The well treatment system of claim 1 wherein the acidic treatment fluid comprises at least one of the following: an alkylamidobetaine; cocoamidopropyl betaine; alpha-olefin sulfonate; trimethyltallowammonium chloride; a $C_8$ to $C_{22}$ alkylethoxylate sulfate; or trimethylcocoammonium chloride.

9. The well treatment system of claim 1 wherein the acidic treatment fluid comprises a corrosion inhibitor that comprises at least one of the following: an acetylenic alcohol; a Mannich condensation product; an unsaturated carbonyl compound; an unsaturated ether compound; formamide; formic acid; a formate; a carbonyl; an iodide; a terpene; an aromatic hydrocarbon; coffee; tobacco; gelatin; cinnamaldehyde; a cinnamaldehyde derivative; an acetylenic alcohol; a fluorinated surfactant; a quaternary derivative of heterocyclic nitrogen base; a quaternary derivative of a halomethylated aromatic compound; cuprous iodide; cuprous chloride; an antimony compound; an antimony oxide; an antimony halide; antimony tartrate; antimony citrate; an alkali metal salt of an antimony tartrate and antimony citrate; an alkali metal salt of pyroantimonate and an antimony adduct of ethylene glycol; a bismuth compound; a bismuth oxide; a bismuth halide; a bismuth tartrate; a bismuth citrate; an alkali metal salts of bismuth tartrate and bismuth citrate; or iodine.

10. A treatment fluid comprising a gelling agent that comprises diutan, wherein the pH of the treatment fluid is less than about 4.

11. The fluid of claim 10 wherein the gelling agent is at least partially crosslinked through a crosslinking reaction that comprises a crosslinking agent.

12. The fluid of claim 11 wherein the crosslinking agent comprises at least one of the following: an iron-based compound; a titanium-based compound; a zirconium-based compound; ferric chloride; titanium lactate; titanium malate; titanium citrate; zirconium lactate; zirconium oxychloride; zirconium hydroxychloride; zirconium citrate; a zirconium complex of hydroxyethyl glycine; ammonium zirconium fluoride; zirconium 2-ethylhexanoate; zirconium acetate; zirconium neodecanoate; zirconium acetylacetonate; tetrakis (triethanolamine)zirconate; zirconium carbonate; ammonium zirconium carbonate; zirconyl ammonium carbonate; zirconium lactate; titanium acetylacetonate; titanium ethylacetoacetate; titanium lactate; titanium citrate; titanium triethanolamine; ammonium titanium lactate; aluminum citrate; chromium citrate; chromium acetate; chromium propionate; chromium malonate; zirconium malate; ammonium; sodium zirconium lactate; or zirconium lactate in combination with isopropylamine or triethanol amine.

13. The fluid of claim 10 wherein the acidic treatment fluid comprises at least one of the following: fresh water; salt water; a brine; a salt; potassium chloride; sodium bromide; ammonium chloride; cesium formate; potassium formate; sodium formate; sodium nitrate; calcium bromide; zinc bromide; sodium chloride; hydrochloric acid; hydrofluoric acid; acetic acid; formic acid; citric acid; ethylene diamine tetra acetic acid; glycolic acid; or sulfamic acid.

14. The fluid of claim 10 wherein the gelling agent is present in the acidic treatment fluid in an amount of from about 10 lb/Mgal to about 200 lb/Mgal.

15. The fluid of claim 10 wherein the acidic treatment fluid comprises at least one of the following: a hydrate inhibitor; a corrosion inhibitor; a pH control additive; a surfactant; a breaker; a fluid loss control additive; a scale inhibitor; an asphaltene inhibitor; a paraffin inhibitor; a foaming agent; a defoamer; an emulsifier; a demulsifier; an iron control agent; a solvent; a mutual solvent; a particulate diverter; a gas; carbon dioxide; nitrogen; a biopolymer other than scleroglucan or diutan; a synthetic polymer; or a friction reducer.

16. The fluid of claim 10 wherein the acidic treatment fluid comprises a gas in the amount of from about 5% to about 95% by volume.

17. The fluid of claim 10 wherein the acidic treatment fluid comprises at least one of the following: an alkylamidobetaine; cocoamidopropyl betaine; alpha-olefin sulfonate; trimethyltallowammonium chloride; a $C_8$ to $C_{22}$ alkylethoxylate sulfate; or trimethylcocoammonium chloride.

18. The fluid of claim 10 wherein the acidic treatment fluid comprises a corrosion inhibitor that comprises at least one of the following: an acetylenic alcohol; a Mannich condensation product; an unsaturated carbonyl compound; an unsaturated ether compound; formamide; formic acid; a formate; a carbonyl; an iodide; a terpene; an aromatic hydrocarbon; coffee; tobacco; gelatin; cinnamaldehyde; a cinnamaldehyde derivative; an acetylenic alcohol; a fluorinated surfactant; a quaternary derivative of heterocyclic nitrogen base; a quaternary derivative of a halomethylated aromatic compound; cuprous iodide; cuprous chloride; an antimony compound; an antimony oxide; an antimony halide; antimony tartrate; antimony citrate; an alkali metal salt of an antimony tartrate and antimony citrate; an alkali metal salt of pyroantimonate and an antimony adduct of ethylene glycol; a bismuth compound; a bismuth oxide; a bismuth halide; a bismuth tartrate; a bismuth citrate; an alkali metal salts of bismuth tartrate and bismuth citrate; or iodine.

* * * * *